(12) United States Patent
Bambino et al.

(10) Patent No.: US 10,252,166 B2
(45) Date of Patent: *Apr. 9, 2019

(54) SHARED SOCIAL ASSET IN GAME

(71) Applicant: Zynga Inc., San Francisco, CA (US)

(72) Inventors: Kathryn Bambino, San Francisco, CA (US); Tiago de Jesus, San Francisco, CA (US); Kevin Wienecke, San Francisco, CA (US); Achint Goel, San Francisco, CA (US); Zhifei Song, San Francisco, CA (US); Niko Vuori, San Francisco, CA (US); Matthew Salazar, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 15/455,902

(22) Filed: Mar. 10, 2017

(65) Prior Publication Data

US 2017/0182420 A1 Jun. 29, 2017

Related U.S. Application Data

(63) Continuation of application No. 13/748,434, filed on Jan. 23, 2013, now Pat. No. 9,630,115.

(51) Int. Cl.
| A63F 13/35 | (2014.01) |
| A63F 13/63 | (2014.01) |
| A63F 13/69 | (2014.01) |
| A63F 13/847 | (2014.01) |
| A63F 13/335 | (2014.01) |

(Continued)

(52) U.S. Cl.
CPC ............ *A63F 13/63* (2014.09); *A63F 13/335* (2014.09); *A63F 13/35* (2014.09); *A63F 13/69* (2014.09); *A63F 13/825* (2014.09); *A63F 13/847* (2014.09); *A63F 13/00* (2013.01); *A63F 13/70* (2014.09)

(58) Field of Classification Search
CPC .......... A63F 13/00; A63F 13/12; A63F 13/35; A63F 13/70
USPC ............................................ 463/1, 9, 39–43
See application file for complete search history.

(56) References Cited

U.S. PATENT DOCUMENTS

| 2011/0107239 A1* | 5/2011 | Adoni ..................... A63F 13/12 |
| | | 715/757 |
| 2011/0281638 A1* | 11/2011 | Bansi .................... A63F 13/795 |
| | | 463/23 |

(Continued)

*Primary Examiner* — William H McCulloch, Jr.
*Assistant Examiner* — Chase E Leichliter
(74) *Attorney, Agent, or Firm* — Penilla IP, APC

(57) ABSTRACT

Methods, systems, and computer programs are presented for online game cooperation. One method includes an operation for receiving a first request from a first user to place a game asset in a first game board of the first user. The game asset is associated with a task to be performed in the game. Further, the method includes an operation for receiving a second request from a second user to place the game asset in a second game board of the second user. The first user and the second user make progress by interacting with the game asset in their respective game boards. When the first user or the second user receives a transactional reward for interacting with the game asset, the transactional reward is also given to the other user. A final reward is given to the first user and to the second user upon completion of the task.

20 Claims, 14 Drawing Sheets

(51) Int. Cl.
  *A63F 13/825* (2014.01)
  *A63F 13/70* (2014.01)
  *A63F 13/00* (2014.01)

(56) References Cited

U.S. PATENT DOCUMENTS

2012/0302350 A1* 11/2012 Murphy .................. H04L 67/38
                                                                 463/42
2013/0190094 A1*  7/2013 Ronen ..................... A63F 13/12
                                                                 463/42
2013/0190096 A1*  7/2013 Ronen ............... H04L 29/06034
                                                                 463/43
2014/0038721 A1*  2/2014 Archer .................. A63F 13/795
                                                                 463/42

* cited by examiner

Quest to obtain feed for the animal

Weight Calculation $t_{ms}$ = time in milliseconds from beginning a pig to becoming "weigh-ready"

$n_{chowFed}$ = number of Hog Chow fed to pig in current state (must be < amount required to reach next state)

$P_{STATE}$ = {1,2,3,4,5} : Final state of the pig $P_{ASSET}$ = {DEFAULT, UNLOCKED, UNLOCKED2, PREMIUM} : Type of pig asset $$weight(P_{STATE}, P_{ASSET}, t_{ms}, n_{chowFed}) = f_{STATE}(P_{STATE}) + f_{ASSET}(P_{ASSET}) + f_{RAND}(P_{ASSET}) + f_{TIME}(t_{ms}) + n_{chowFed}$$

Fig. 7A

Reward table based on weight ranges

| Prize Tier | Min Weight | Max Weight | Blue Ribbon? | Supplemental Prize A | Main Prize | Supplemental Prize B |
|---|---|---|---|---|---|---|
| 1.1 | 0 | 32 | | 150 XP | 2 Corndog Seeds | 300 Coins |
| 1.2 | 33 | 65 | | 300 XP | 5 Corndog Seeds | 600 Coins |
| 1.3 | 66 | 99 | | 600 XP | 2 Hog Chow | 1 Dinner |
| 2.1 | 100 | 132 | | 1,000 XP | 3 Fast Hands Boosts | 5 Corndog Seeds |
| 2.2 | 133 | 165 | | 1,500 XP | 3 Hog Chow | 5 Dinners |
| 2.3 | 166 | 199 | | 5 Hog Chow | 2 Fully Grown Willow Trees | 10 Corndog Seeds |
| 3.1 | 200 | 232 | | 7 Hog Chow | 1 Butterscotch Pig | 3,500 XP |
| 3.2 | 233 | 265 | | 1 Ultimate Chili | 1 Floppy Fair Hare | 2 Aged Salmon |
| 3.3 | 266 | 299 | | 1 Ultimate Chili | 1 Spicy Prize Pig | 10 Hog Chow |
| 4.1 | 300 | 332 | | 1 Angus Cow | 3 Quick Draw Quaff | 10 Hog Chow |
| 4.2 | 333 | 365 | YES | 2 Mystery Animal Crates (mystery_animal_crate5) | 3 Ultimate Chilies | 1 Beef Jerky |
| 4.3 | 366 | 400 | YES | 2 Raging Buffalo | 2 Crazy Cakes | 5 Aged Salmon |

Fig. 7B

ID
SHARED SOCIAL ASSET IN GAME

CROSS REFERENCE TO RELATED APPLICATIONS

This application is a continuation of and claims priority to and the benefit of patent application Ser. No. 13/748,434, filed on Jan. 23, 2013, which is incorporated by reference in its entirety.

BACKGROUND

1. Field of the Invention

The present embodiments relate to methods for executing games in a distributed environment, and more particularly, methods, systems, and computer programs for player cooperation in a game.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

In social MMO games, players collaborate in order to play the game and make progress. Interactions between players tend to be burdensome, requiring a significant amount of effort and time to perform these interactions. For example, if the player wishes to visit a friend's farm, the game must exit the player's farm, load the friend's farm, perform game activities while in the friend's farm, exit the friend's farm, and reload the player's farm. This substantial effort is an obstacle that hinders online game interactions.

Additionally, some games provide challenges to players, where the challenges entail the completion of one or more tasks within the game. Each player must perform the required tasks to complete the challenges. As the player completes each challenge, the player receives rewards and new challenges are made available to continue the game.

In order to keep players engaged in the game, and to foster social interactions within the game, a system is desired that would enable easier social interactions while improving the reward mechanism associated with challenge completion.

It is in this context that embodiments arise.

SUMMARY

Methods, devices, systems, and computer programs are presented for playing an online game and allowing player cooperation in the online game. It should be appreciated that the present embodiments can be implemented in numerous ways, such as a method, an apparatus, a system, a device, or a computer program on a computer readable medium. Several embodiments are described below.

In one embodiment, a method for playing a game includes an operation for receiving a first request from a first user to place a game asset in a first game board of the first user. The game asset is associated with a task to be performed in the game. Further, the method includes an operation for receiving a second request from a second user to place the game asset in a second game board of the second user. The first user and the second user make progress by interacting with the game asset in their respective game boards. When the first user or the second user receives a transactional reward for interacting with the game asset, the transactional reward is also given to the other user. A final reward is given to the first user and to the second user upon completion of the task In another embodiment, a method for playing a game includes an operation for receiving a first request from a first user to place a game asset in a first game board of the first user, where the game asset is associated with a task to be performed in the game. The first user makes progress towards completing the task by interacting with the game asset in the first game board. Further, the method includes an operation for detecting that a second user has accepted an invitation to cooperate with the first user for interacting with the game asset, where the second user makes progress by interacting with a copy of the game asset in a second game board of the second user. A final reward from a plurality of possible final rewards is determined. Upon completion of the task, the determined final reward is provided to the first user and to the second user. Operations of the method are executed by a processor.

In yet another embodiment, a computer program embedded in a non-transitory computer-readable storage medium, when executed by one or more processors, for playing a game, is provided. The computer program comprises program instructions for receiving a first request from a first user to place a game asset in a first game board of the first user, where the game asset is associated with a task to be performed in the game. The first user makes progress towards completing the task by interacting with the game asset in the first game board. The computer program further includes program instructions for receiving a second request from a second user to place the game asset in a second game board of the second user, where the second user makes progress by interacting with the game asset in the second game board. Further yet, the computer program includes program instructions for detecting that one of the first user or the second user receives a transactional reward for interacting with the game asset and giving the transactional reward to the other user in response to the detecting. The computer program further includes program instructions for providing a final reward to the first user and the second user upon completion of the task.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 7A-7B illustrate methods for calculating the final reward, according to one embodiment.

DETAILED DESCRIPTION

The following embodiments describe methods, systems, and computer programs for improving player cooperation in an online game. It will be apparent, that the present embodiments may be practiced without some or all of these specific details. In other instances, well known process operations have not been described in detail in order not to unnecessarily obscure the present embodiments.

Figure 1:
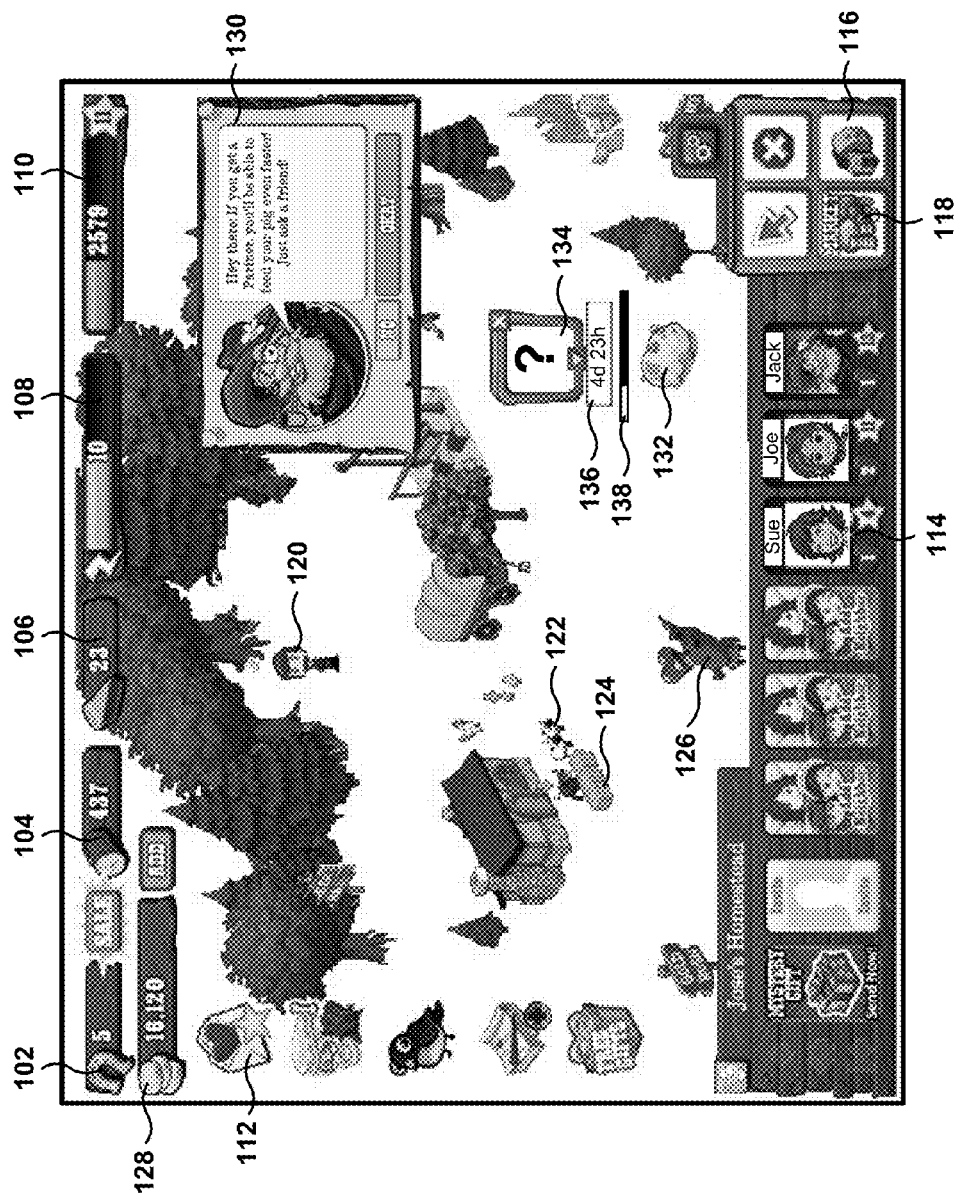
FIG. 1 shows an interface for playing an online game, according to one embodiment.

FIG. 1 shows an interface for playing an online game, according to one embodiment. The embodiment of FIG. 1 shows a screen capture of the game board for the game Pioneer Trail, formerly known as FrontierVille, provided by Zynga Inc., the assignee of the present application. The principles presented herein may be applied to other online games, as well as to games that are not played online. In Pioneer Trail, each player has her own game board, also referred to as a homestead, home board, etc., where each player performs game-relate activities. In addition, a player may visit the game board of other players, to perform viral interactions in the game boards of the other players.

The Pioneer Trail is a simulation, role-playing video game available for play on social networking sites. The player plays the role of a pioneer of the American old west and utilizes an avatar which resembles a pioneer. The player may complete collections which may be traded for coins, experience points (XP), decorations, livestock, trees, craftable items, energy and horseshoes (rare money that can be bought with real money). The player may also finish goals which include tasks such as gathering money, buying energy, clearing land, chopping down trees, raising livestock and trees, creating items such as beds, furniture, and clobbering unwanted pests like bears, snakes, foxes and groundhogs. Eventually the player may acquire a spouse and have children.

Other tasks include collecting from buildings, building inns, wagons, general stores, cabins, schools, chicken coops, barns, trading posts, barber shops, churches, and sawmills as well as seeding, growing and harvesting crops. Coins enable the player to purchase decorations, buildings, crops, trees and animals. Horseshoes, which can be earned in-game or purchased through real-world cash or credit, allow the player to buy mules and horses, paint buckets, hand drills, nails, bricks, hammers, etc. These items are essential for completing certain goals. Friends may also "gift" some items to the player, which is referred to herein as a viral interaction.

Crops may be planted and must be harvested before they wither, and the crops with longer maturation times provide larger payoffs. Harvesting may trigger encounters with ground hogs, which must be "clobbered" to avoid using extra energy within their area of influence. Clobbering pests and harvesting crops yield coins, XP, and food. Food can be used to get energy, which is necessary to perform some actions in the game. Energy can be purchased in exchange for food or horseshoes. When the player runs out of energy, the player must either purchase more energy with food or horseshoes, or wait for more energy to build up over time.

Animals may be purchased and harvested routinely for resources, or sold outright for a large one-time reward. In one embodiment, the animals start out as juveniles and must be fed several times to grow into adults. Players can also plant fruit trees, such as cherry, apple, pear, peach, apricot, etc., and their fruits may be collected when the trees reach maturity.

The game shown in FIG. 1 includes avatar 120, which can be manipulated by the player, such as by clicking the mouse around the play area. For example, if the mouse is clicked somewhere far away from the avatar, the avatar is moved to the faraway place, unless the mouse is clicked on some other game object that causes an in-game action (e.g., if the mouse is clicked on an animal, the avatar feeds the animal).

As the player advances in the game, the player acquires assets, which can take multiple forms. In one embodiment, assets include first virtual currency asset 102, second virtual currency 128, wood asset 104, food asset 106, energy asset 108, sheep asset 122, haystack asset 124, dancing bear asset 126, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 102 can be used during the game to make progress, also referred to herein as advancement. The first virtual currency 102 can be used to acquire assets (e.g., animals or crops), to remove an obstacle in the game (e.g., enabling progress that would otherwise be blocked), or to complete a task (e.g., finish decorating a house).

In one embodiment, the online game includes quests 112, which may also be referred to as missions, goals, challenges, etc. Each quest identifies one or more tasks that the player must complete before the quest is considered satisfied or finished. For example, a quest may require three tasks: chopping down a tree, feeding an animal, and planting an apple tree. Upon completion of the quest, the player is rewarded in some fashion, such as by getting a new asset, increasing the amount of energy, getting more virtual currency, etc. As the player completes tasks and quests, the game score 110 is increased, and as the game score increases the experience level may also increase.

Clicking on inventory icon 116 causes the online game to display a list of all the items or assets owned by the player. In addition, clicking on marketplace icon 118 takes the player to a virtual marketplace where assets can be acquired. As described above, assets can be from within different categories such as crops, trees, animals, buildings, decorations, energy, special items, weapons, etc. Each category includes a plurality of assets within the category. For example, the animal category includes ducks, chickens, goats, sheep, pigs, etc. Some of the items within a category can be freely acquired by the player, while purchasing of some items can be blocked until certain game condition is met, such as reaching some score, finishing a quest, purchasing the ability to unblock the blocked item, etc.

In one embodiment, the online game is an online social game, which leverages social relationships between the player and other online game players socially linked to the player. For example, the player may add a neighbor to the game by inviting a friend from a social networking site. There are several online social networks run and maintained by various companies, and any one of these companies can provide access to social graph data. Once a friend accepts being a neighbor, a social relationship is established in the game where the game played by the player and the game played by the neighbor can interact with each other. For example, the player may visit the home of the neighbor and perform some game activities therein, and will be rewarded for doing so. Some of the quests in the game may include social activities that promote the interaction between players. For example, one quest may include planting tomatoes in the neighbor's farm. Therefore, the social interaction can provide advancement for the player and for the neighbor.

Embodiments presented herein allow a player to place a social asset 132 in the player's game board. As used herein, a social asset is a game asset that may be placed in the game boards of two or more players. A player that has a social asset in her game board is able to interact with the social asset without having to visit other player's game boards. Each social asset is associated with the two or more players that have placed the social asset in their game boards, and the two or more players are able to interact with the social asset independently of the interactions of the other players with the social asset. As used herein, partners, or social-asset partners, are referred to as the players that have placed the social asset in their game board, i.e., each player is a partner of the other players for the purpose of performing a task or quest associated with the social asset. The tasks or quest associated with the social asset is referred to herein as a social asset task, or a social asset quest.

In the embodiment illustrated in FIG. 1, a player has placed a social asset 132, which is a pig in one embodiment, in the game board. For description purposes, the principles illustrated herein are presented for embodiments utilizing 2 partners cooperating to make progress for a social asset. However, the principles presented herein are also applicable to any number of partners (e.g., 3, 4, 5, etc.), and the embodiments illustrated should therefore not be interpreted to be exclusive or limiting, but rather exemplary or illustrative. In one embodiment, the social asset may be developed by a single player without having to partner with other players.

Associated with social asset 132, a progress bar 138 indicates graphically the progress made in the social asset task (e.g., reach a minimum weight for the pig), and a timer indicates the amount of time left to complete the social asset task. A partner icon 134 has two states: a first state where no partner has been set, and a second state where one or more partners have been established. In the first state, a graphical icon (e.g., a question mark) indicates that no partner has been chosen. A message 130 may be presented to the user to suggest the user that the user may invite others to partner in the completion of the task associated with the social asset.

In the second state, a different icon is presented, such as photograph or icon associated with the partner. In one embodiment, the icon corresponds to a profile picture of the partner in a social network.

It is noted that the embodiments illustrated in FIG. 1 are exemplary. Other embodiments may utilize different social assets, quests, social interactions, number of partners, social asset representation, etc. The embodiments illustrated in FIG. 1 should therefore not be interpreted to be exclusive or limiting, but rather exemplary or illustrative.

Figure 2B:
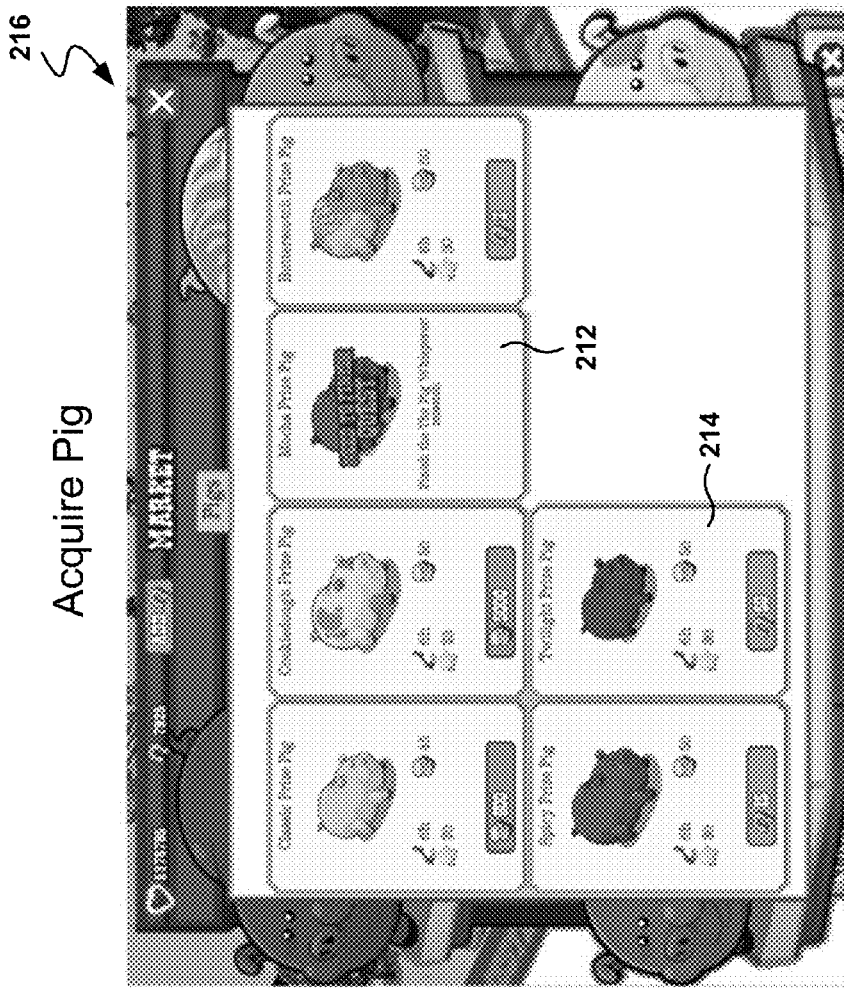
FIGS. 2A-2B illustrate a method and interface for obtaining and evolving a social asset, according to one embodiment.
Figure 2A:
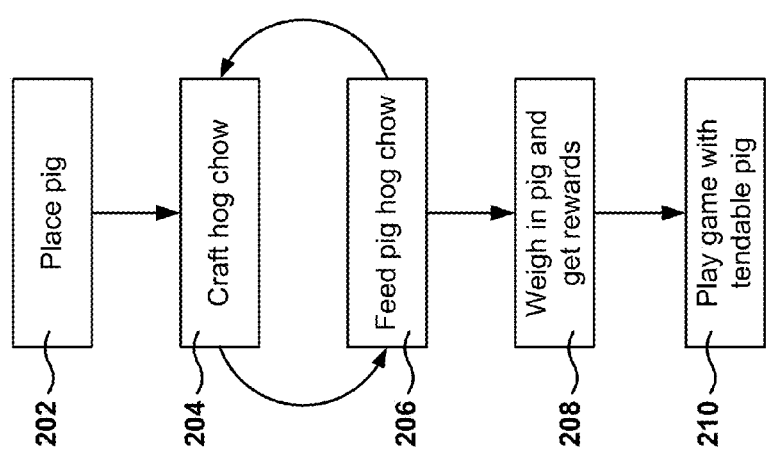

FIGS. 2A-2B illustrate a method and interface for obtaining and evolving a social asset, according to one embodiment. FIG. 2A illustrates the basic flow for the evolution of a social asset. Evolution of the social asset, also referred to herein as development, is referred to as the process related to developing the social asset, from birth to completion of the social asset quest (i.e., operations 202, 204, 206, and 208 in FIG. 2A). It is noted that the social asset may also be involved in other game activities after the quest is completed (i.e., after the evolution process finishes), such as tending (e.g., feeding) the pig in the game board.

In operation 202, the social asset is placed on the game board of the player. As described in more detail below with reference to FIG. 2B, the pig may be acquired in the market, taken from inventory, or acquired in some other method supported by the game, such as by receiving a gift or a random reward, etc. After the player places the pig in the board, the player has to feed the pig to facilitate the pig growth.

Another way to obtain the social asset is by being invited to partner with another player that has already placed the social asset in her board. In one embodiment, the social asset is free to partners, since the first partner already paid for the social asset. In other embodiments, the partners are also asked to pay (e.g., with virtual currency) for adding the social asset to their game board, although the cost may be different or may be the same.

In some existing social games, players have viral interactions with other players that require a player to visit the board of another player. This usually takes a relatively large amount of time for a player, since the player has to select the option to visit the friend, load the game board of the friend, perform operations in the game board of the friend, select to go back to the home board, and then load the home board again. Embodiments allow players to perform viral interactions via the social asset without having to visit the partners' boards, because each player has her own version of the social asset in their own game board. The difference with other previous viral interactions is that both partners get a copy of the social asset in their own game board, and each partner may interact with the social asset independently.

Additionally, the partners are working together towards achieving a common goal. In some other viral interactions, a player has a game asset and a friend helps the player in some way, but the helper does not get the same rewards as the player that has the asset in her board. Here, both players act together to achieve a common goal and both players get the same reward, in one embodiment. This provides an incentive to work together and facilitate easy and quick viral interactions. The first partner has an incentive to invite others, in order to grow the pig faster, and partners have the incentive to cooperate with the first original partner in order to obtain game rewards.

From operation 202, the method flows to operation 204, where hog chow (i.e., feed for the pig) is crafted. In one embodiment, the hog chow is not directly available in the market, and the player must perform some quest to obtain the hog chow. For more details regarding crafting hog chow, see details provided below with reference to FIG. 4A. In other embodiment (not shown), the hog chow is available in the market and the player may purchase the hog chow directly using virtual currency.

Once the player completes the quest to craft the hog chow, the player may feed the pig in operation 206. From operation 206, the player may go back to operation 204 to obtain more hog chow and continue feeding the pig.

In one embodiment, the player has a limited amount of time to grow the pig, and once this time expires, the pig is ready to be weighed. In other embodiments, the pig may also be ready to be weighed under other conditions, such as when the pig has reached a predetermined minimum amount of weight, and the player selects the option to weigh the pig.

In operation 208, the pig is weighed and rewards are calculated according to the final weight of the pig. Each partner weighs the pig separately, but the final weight is the same for all the partners. In addition, the final reward (i.e., the reward given after the weigh in) is the same for all the partners.

From operation 208, the method flows to operation 210. At this stage, the social asset task has terminated. The social asset stays in the board and may be interfaced with the player, in similar fashion to other assets that the player has in the game board. For example, the player may continue feeding the pig in order to obtain game rewards.

FIG. 2B illustrates an interface 216 for obtaining a social asset in a market purchase interface, according to one embodiment. A player may select a social asset by visiting the market (e.g., option 118 in FIG. 1). FIG. 2B illustrates a graphical user interface for buying a pig. In one embodiment, there are several kinds of pigs that can be raised as social assets (e.g., Twilight Price Pig 214). Some social assets may be restricted and their availability being conditional on completing some game quest or reaching a predetermined game level. For example, in the embodiment of FIG. 2B, Mocha Price Pig 212 requires that the player completes a game quest before being available to the player.

Each social asset has a price, which may be specified in some type of virtual currency. In some embodiments, there may be other conditions to acquire the pig, such as the expertise level of the player, etc. Once the player selects a social asset and pays the required price, the player is able to place the social asset in her game board. In addition, the player is able to invite a partner to raise the pig. In one embodiment, partnering is optional because a player is able to raise the pig without having to partner with other players.

It is noted that the embodiment illustrated in FIG. 2B is exemplary. Other embodiments may utilize different social assets and different tasks. For example, the task may be one of raising an animal, harvesting a crop, building a structure, building a car, staffing a building or an enterprise (e.g., a franchise), building a manufactured article, solving a puzzle, obtaining a collectible associated with a current event (e.g., the Olympic Games, the Super Bowl, the World Series, etc.), completing a challenge, raising a unicorn, building a balloon, etc. The embodiments illustrated in FIGS. 2A and 2B should therefore not be interpreted to be exclusive or limiting, but rather exemplary or illustrative.

Figure 3B:
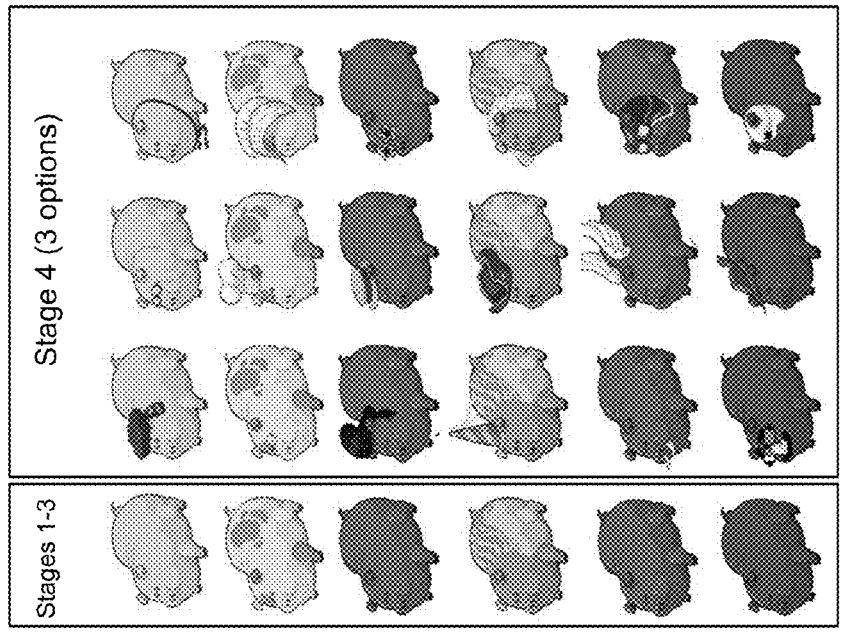
FIGS. 3A-3B illustrate embodiments of the different growth stages for a shared social asset, according to one embodiment.
Figure 3A:
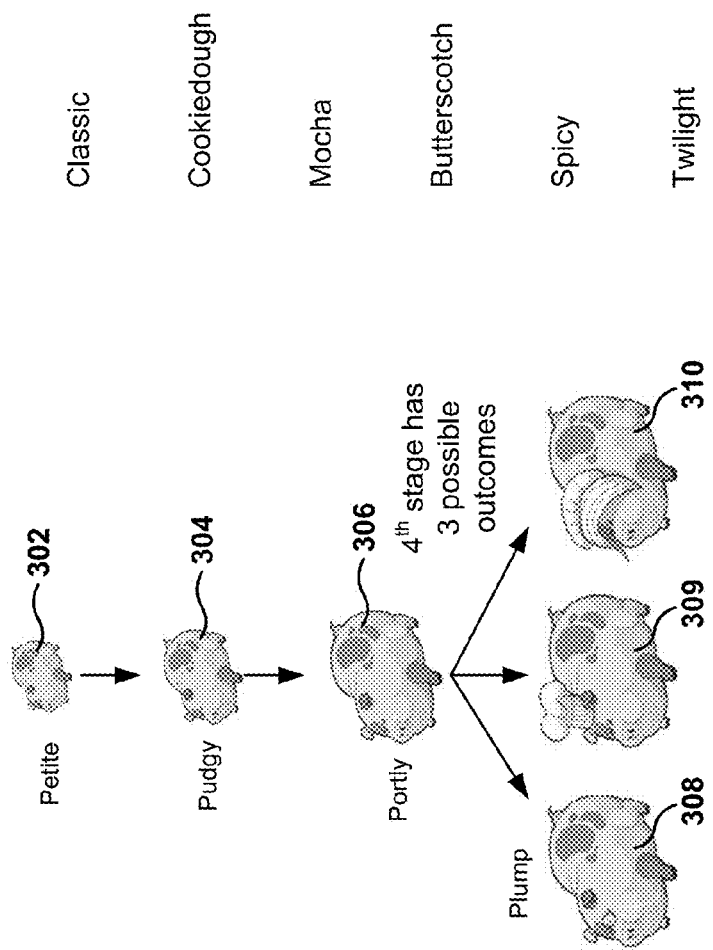

FIGS. 3A-3B illustrate embodiments of the different growth stages for a shared social asset, according to one embodiment. In one embodiment, the pig evolution has four stages or states. At each stage, the icon associated with the social asset changes in the game board to indicate that the asset is evolving (e.g., the pig is growing). In another embodiment, there may be more intermediate stages for the growth of the pig. For example, in one embodiment, the size of the pig is related to the weight of the pig, where the image of the pig gradually grows as the pig is fed and gains weight.

In one embodiment, the pig growth stages are: Petite 302, Pudgy 304, Portly 306, and Plum 308-310. In addition, at each stage the game may provide a different icon for the pig, thereby increasing variability and providing an opportunity for collectors to obtain different types of final pigs. For example, in the embodiment of FIG. 3A, the fourth stage (Plump) has three different possible outcomes 308, 309, and 310.

In one embodiment, at the end of the social asset task a copy of the social asset is kept in the game. The copy kept in the game corresponds to the stage reached during the evolution of the social asset. For example, if a player only reaches the Pudgy 304 stage, a Pudgy pig will be kept in the board. However, if the player reaches the fourth stage (Plump), one of the three Plump pigs will remain in the board. Since there are three possible outcomes, the player may repeat growing the same social asset in order to collect the three different types of Plump pigs.

FIG. 3B illustrates the variability that may be achieved when raising the pig, according to one embodiment. In one embodiment, there six different types of pig social assets (Classic, Cookiedough, Mocha, Butterscotch, Spicy, and Twilight), and each pig has three different possible outcomes at stage 4. Accordingly, for players that are able to reach stage 4, there are 18 possible prized pigs that may be acquired and kept in the game board.

It is noted that the embodiments illustrated in FIGS. 3A-3B are exemplary. Other embodiments may utilize different number of stages, different number of possible outcomes, different number of pigs, etc. The embodiments illustrated in FIGS. 3A-3B should therefore not be interpreted to be exclusive or limiting, but rather exemplary or illustrative.

Figure 4A:
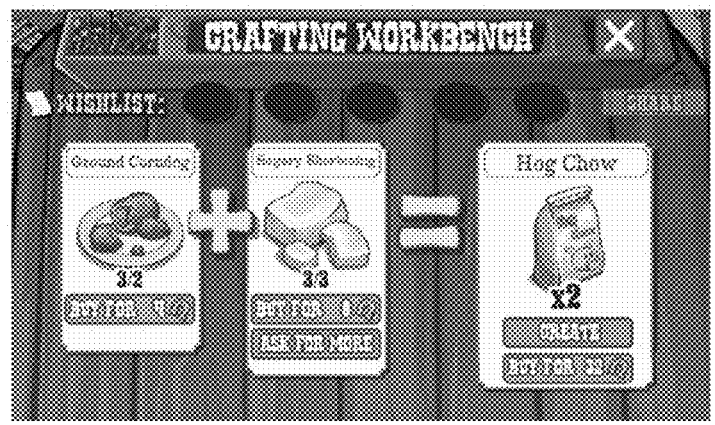
FIGS. 4A-4B illustrate interfaces for crafting animal feed and for managing social assets, according to one embodiment.
Figure 4B:
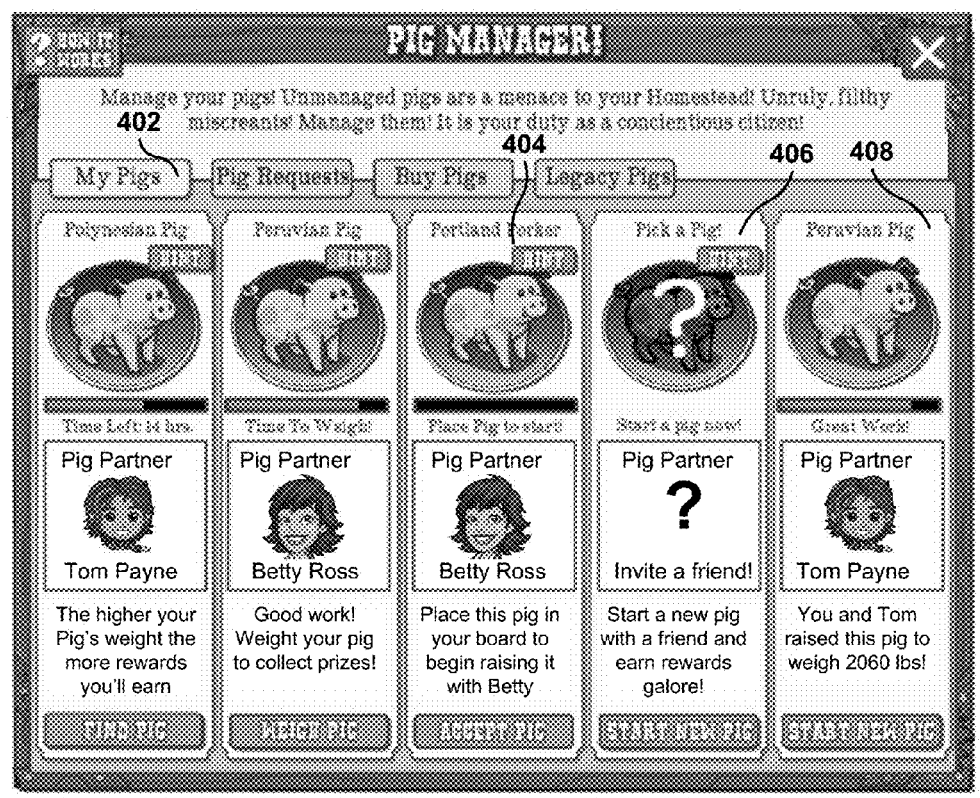

FIGS. 4A-4B illustrate interfaces for crafting animal feed and for managing social assets, according to one embodiment. As described above, a social asset quest identifies one or more game activities that the player must complete before the social asset quest is considered satisfied or finished. Once the social asset quest is completed, the player receives a reward.

In one embodiment, a game quest is defined to obtain an item required to evolve the social asset (e.g., hog chow). FIG. 4A illustrates a game quest that requires completion of two tasks to obtain hog chow. The first task is to ground corndog 2 times, and the second task is to obtain sugary shortening 3 times. The game defines how each task has to be completed, which may involve spending virtual currency, asking friends for help, completing a collection, etc. In the embodiment of FIG. 4A, once the player completes both tasks the player obtains two units of hog chow. In another embodiment, the player may obtain the hog chow by spending virtual currency, without having to complete the defined tasks.

Once the player obtains the hog chow, the hog chow is added to inventory and the player may use the hog chow to feed any of the pigs that are social assets in her game board.

FIG. 4B illustrates an interface for managing social assets (e.g., pig social assets), according to one embodiment. In one embodiment, the pig manager includes several tabs to select different options associated with the social asset. In one embodiment, the task includes "My Pigs" 402 (to manage pigs owned by the player), "Pig" (to manage pig requests), "Buy Pigs" (to access the market interface to buy pigs), and "Legacy Pigs" (to manage social asset pigs that have already been completed).

The interface of FIG. 4B is for the "My Pigs" 402 tab. Here, the player is able to see the different pigs owned by the player, and information associated therewith, such as the name of the partner, the progress made to date, the stage of the pig, an invitation to partner 404, an invitation to start a new pig 406, completed pigs 408, etc.

Figure 5:
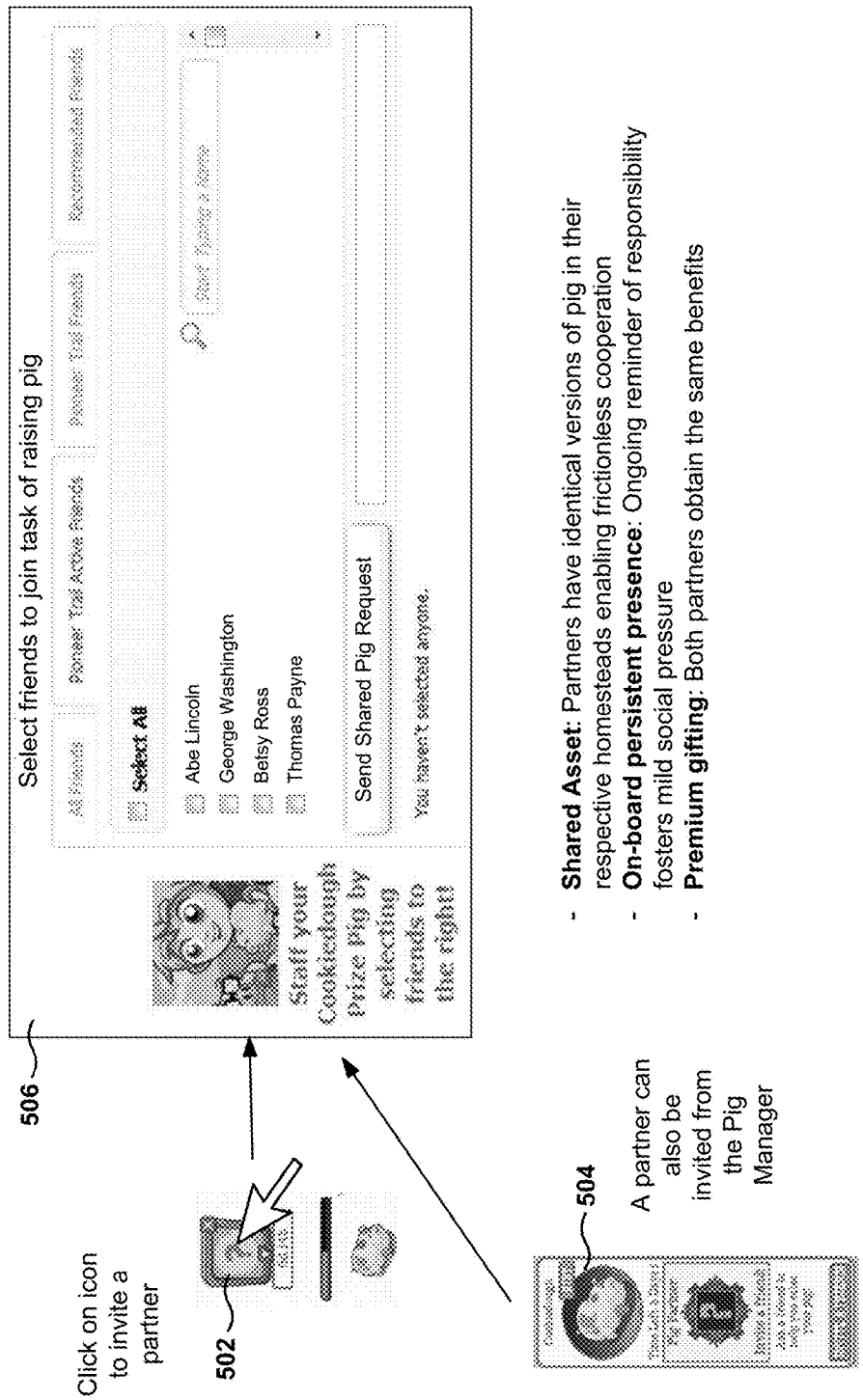
FIG. 5 illustrates an interface for inviting a friend to share a social asset, according to one embodiment.

FIG. 5 illustrates an interface for inviting a friend to share a social asset, according to one embodiment. As discussed above, the social asset may be used by a single player, or may be shared by two or more players that partner towards achieving the task associated with the social asset.

In one embodiment, after the player acquires the social asset, the player is able to select the icon 502, placed above the social asset, to invite one or more friends to partner. In other embodiments, the player may also invite others to partner in the social asset manager 504 from the pig manager interface, as described above with reference to FIG. 4B.

Once the player selects the option to invite one or more partners, user interface 506 is presented to the player. The interface provides the player with several options to select friends, such as listing all friends in the social network, friends playing the same game, players that are friends in the game but not in the social network, friends recommended by the game, etc.

Once the player selects one or more friends to invite and clicks on the button "Send Shared Pig Request," the game will send social network requests to the identified players. In one embodiment, requests appear as reminders in a notifications area in the social network. For example, the request may appear on the left panel of the social network webpage. Sometimes, the requests may be grouped by game. In one embodiment, each request includes an icon, a name of the game or some other identifier, and a counter indicating how many different requests have been originated in the corresponding game for this user.

It is noted that the other embodiments may utilize different methods for inviting partners. For example, the player may invite others via email, text message, placing a message in the social network feed, etc. Social network feeds appear in the feed section, and are posted by the requester in the requester's feed. Friends that have access to the requester's feed will see that the friend is asking to partner. In one embodiment, the feed request includes: the name of the requester; a title for the feed request; a message giving details of the help wanted by the friend; information about the feed (e.g., the time that the feed request was posted), and buttons to provide feedback on the feed.

If a friend accepts the invitation to become a partner, the game asks the partner to place the asset in her own game board. The social asset in the partner's game board will have a profile picture of the friend that invited the partner. This way, the partner knows who the partner is cooperating in the development of the social asset. Both players have access to the social asset in their own game board, and both players contribute to the evolution of the social asset. The partners do not compete with each other because the partners obtain the same rewards, independently of how much each partner contributes.

Figure 6A:
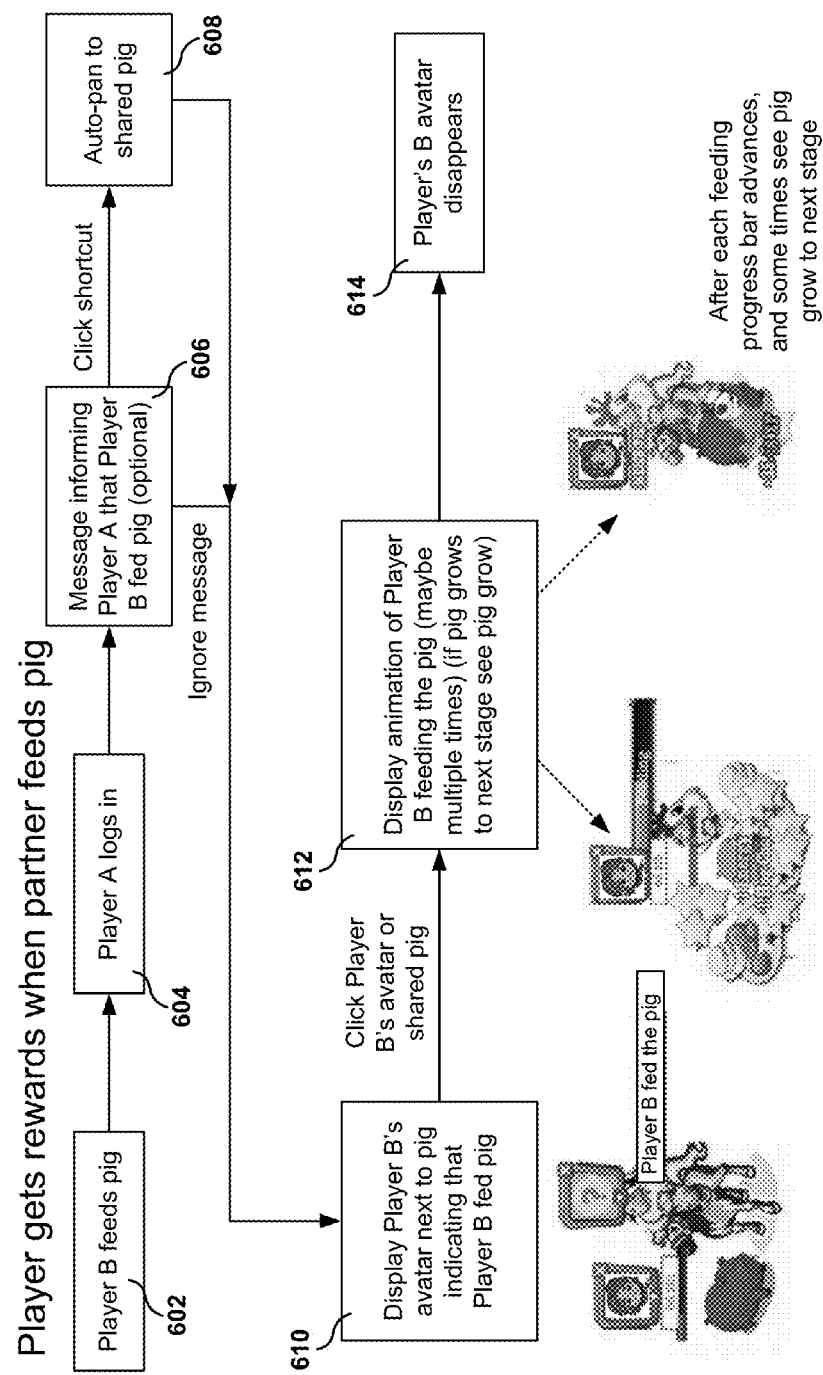
FIG. 6A illustrates a method for sharing rewards, according to one embodiment.

FIG. 6A illustrates a method for sharing rewards, according to one embodiment. For description purposes regarding the embodiment of FIG. 6A, there are two players, Player A and Player B, that have partnered to evolve a social asset. In operation 602, Player B feeds the pig. At a later time, when Player A logs 604 into the game, a message 606 is displayed to let Player A know that Player B has fed the pig. In another embodiment, the message is not displayed, and Player A may find out about the activities of the partner in other ways, such as by informational icons or messages displayed next to the social asset.

If Player A clicks on a shortcut placed by the message shown in operation 606, the method flows to operation 608, where the focus of the game board shifts to the social asset in order to let the player easily interface with the social asset. If the player does not select the shortcut, the method flows to operation 610. Also, the method flows to operation 610 after operation 608.

In operation 610, an indicator is placed next to the social asset informing Player A that the pig was fed by the partner. If Player A clicks on the avatar of Player B or clicks on the shared asset, the method flows to operation 612. In operation 612, an animation of Player B feeding the pig is displayed. If Player B has fed the pig several times, the animation may be repeated several times. Also, if as a result of the feeding by Player B the pig reaches the next growth stage, the icon of the pig will be updated to reflect that the pig is now in a new stage. In addition, if the pig reaches the final stage where the pig may be weighed, the icon associated with the pig may also reflect that the pig is ready to be weighed to get the final reward.

In one embodiment, after the animation is completed the avatar of Player B disappears 614. In summary, Player A sees the progress made by the partner and an animation is displayed to show how the partner fed the pig. Also, as a result of the animation, Player A gets the goobers and the rewards associated with feeding the pig. In one embodiment, Player A gets the same rewards that Player B received for feeding the pig.

Figure 6B:
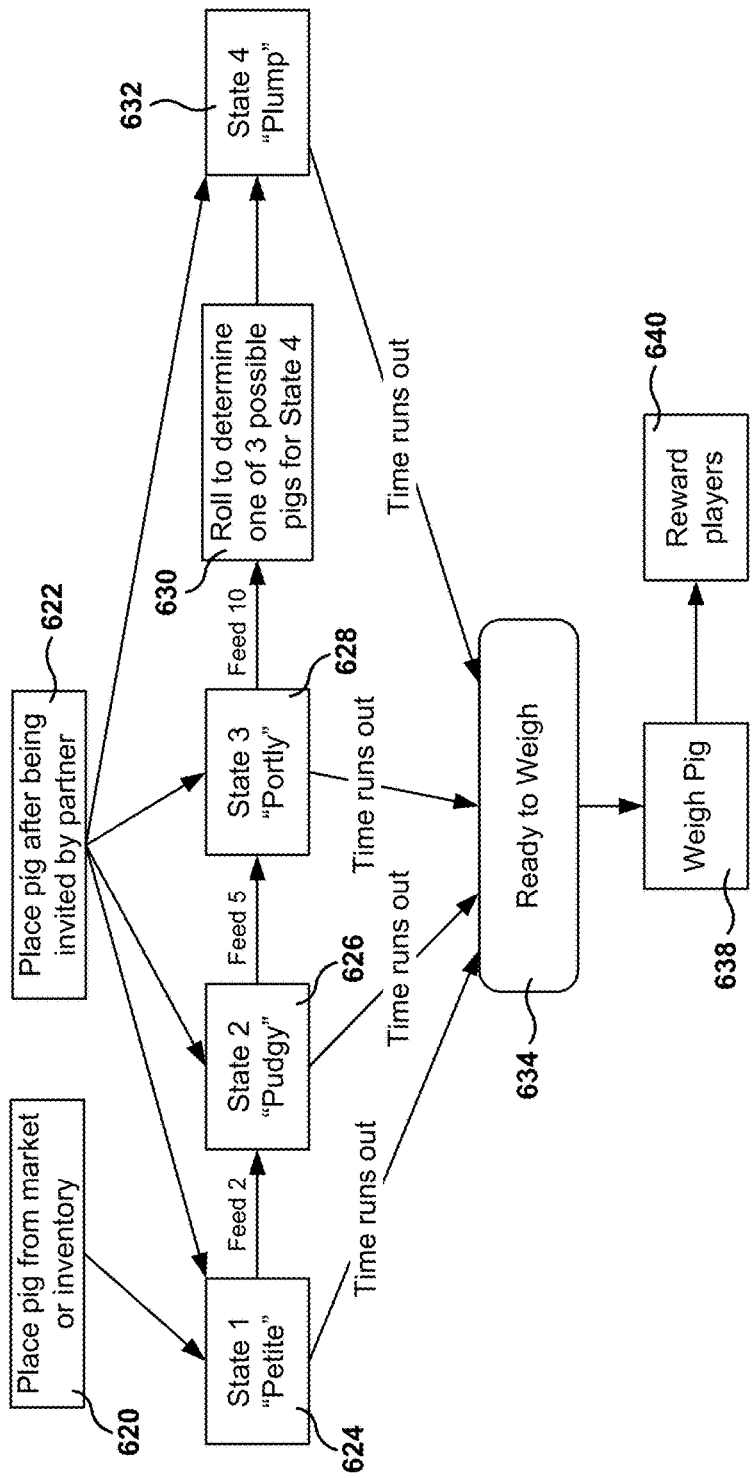
FIG. 6B illustrates the different stages for the evolution of the social asset, according to one embodiment.

FIG. 6B illustrates the different stages for the evolution of the social asset, according to one embodiment. The pig may be placed on the game board after being obtained in the market or from inventory 620, or the pig may be placed on the game board after accepting an invitation from a partner 622.

In one embodiment, there is a limited amount of time to raise the pig (e.g. a week, although other time periods are also possible). For example, the time to raise a pig may be a few hours, one or more days, several weeks, a month, several months, a year, etc. If the final stage is not reached within the allotted time the players get some rewards, but the rewards are not as good as the rewards obtained when the pig is raised to completion (i.e., the pig reaches a minimum weight). For example, it is possible that a player places the pig in the game board and does nothing about the pig; at the end, the player will get a reward but the reward will be small. In the embodiment shown in FIG. 6B there are 4 stages associated with the evolution of the pig. For description purposes, a stage is also referred to as a state.

In one embodiment, the first four states are the same states previously described above with reference to FIG. 3A: Petite 624, Pudgy 626, Portly 628, and Plum 632. The player that first places the social asset in her game board always starts at state 1. However, since a partner may join at any time, the social asset may have already developed into other state different from the first state. Therefore, from operation 622, the partner may go to either one of the different states 624, 626, 628, or 632.

As the players feed the pig, the social asset evolves into more advanced states, once the required weight for each state is obtained. In one embodiment, since state 4 may have 3 different possible outcomes, in operation 620 a random determination is made to select one of the possible pigs for state 4.

At any of the different states, if the timer to evolve the social asset runs out, the method flows to operation 634 where the pig is ready to be weighed. Once the player selects to weigh the pig 638, rewards are given to the player in operation 640.

Figure 6C:
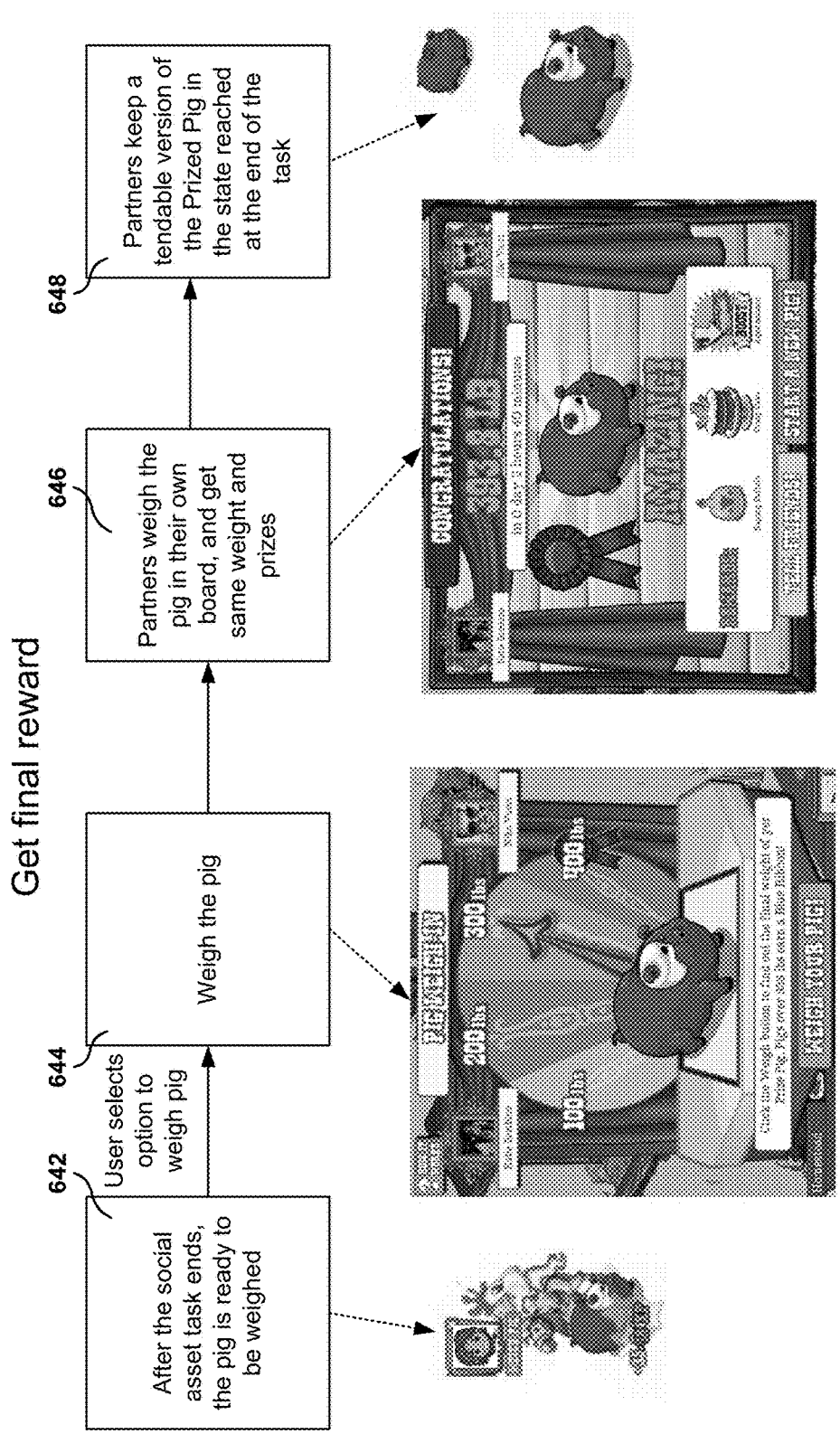
FIG. 6C illustrates an interface for obtaining the final reward, according to one embodiment.

FIG. 6C illustrates an interface for obtaining the final reward, according to one embodiment. As used herein, the final reward is the reward given to a player when the social asset task ends. The social asset task is over 642 when the time allocated to perform the social asset task expires, or when a goal (e.g., reach a minimum weight, feed the pig 20 times, etc.) defined in the social asset task is reached. Of course, the social asset task may include a plurality of tasks or quests (e.g., feed the pig 15 times, where feeding the pig requires the completion of a quest to obtain pig feed—i.e., hog chow).

In one embodiment, when the social asset task ends an indicator is presented to show that the social asset task has ended. For example, in the embodiment of FIG. 6C, a button with the message "Weigh Pig" is provided next to the social asset icon, but other buttons, indicators, or messages are also possible.

From operation 642, the method flows to operation 644 where the pig is weighed. In one embodiment, the pig is weighed when the user selects an option to weigh the pig, but other triggers to weigh the pig are also possible. The final weight of the pig is proportional to the amount of times that the pig has been fed. This means, that the final reward is based on the performance by the partners. More details regarding the calculation of the final reward are given below with reference to FIGS. 7A-7B.

In one embodiment, each partner weighs the pig in her own game board 646, but all the partners get the same final weight and the same final rewards, although the reward may be given at different times, depending on when the partners collect their final reward. In one embodiment, the partners also get the same final pig icon, but other embodiments may assign different final pig icons to each of the players.

The final rewards may include different amounts of game assets, virtual currency, energy, etc. For example, the final rewards may include a Buffalo that may be placed in the game board, a cake, and a shortcut to speed up growth of a fish, but other combinations of rewards are also possible.

In other embodiments, the final rewards are not the same for all partners. For example, the final rewards may be proportional to the contribution made by each of the partners. This encourages participation by the partners because the final reward will be based on actual participation in the social asset task.

After the social asset task ends, and after getting the final rewards, the partners keep a tendable version of the pay in the state reached when the social asset task ended. Tendable, as used herein, refers to the ability of the player to continue interacting with the social asset (e.g., feeding the pig).

FIGS. 7A-7B illustrate methods for calculating the final reward, according to one embodiment. As discussed above, the weight of the pig determines the final reward. This means that the more partners interact with the pig, the bigger the rewards will be. This compels player to interact more, which may translate into more virtual currency purchases.

FIG. 7A illustrates an embodiment for determining the final weight, which determines the final reward. In one embodiment, the final weight is determined according to the following equation:

$$\text{weight}(P_{STATE}, P_{ASSET}, t_{ms}, n_{chowFed}) = f_{STATE}(P_{STATE}) + f_{ASSET}(P_{ASSET}) + f_{RAND}(P_{ASSET}) + f_{TIME}(t_{ms}) + n_{chowFed}$$

The final weight is a function of $P_{STATE}$, $P_{ASSET}$, $t_{ms}$, and $n_{chowFed}$, where $P_{STATE}$ is the final state reached, $P_{ASSET}$ is the type of social asset (e.g., pig), $t_{ms}$ is the time in milliseconds from beginning of the social asset task to the end of the social task, and $n_{chowFed}$ is the number of times that the pig has been fed in the current state. In addition, $f_{STATE}$, $f_{ASSET}$, $f_{RAND}$, and $f_{TIME}$ are functions dependent on their corresponding variables. In one embodiment, $f_{RAND}$ is a random function that provides a degree of randomness for the corresponding type of social asset.

It is noted that the embodiments illustrated in FIG. 7A are exemplary. Other embodiments may utilize different variables and/or functions. The embodiments illustrated in FIG. 7A should therefore not be interpreted to be exclusive or limiting, but rather exemplary or illustrative.

In one embodiment, weight ranges are utilized to calculate the final reward. After the pig is weighed, a prize tier is determined. The prize tier encompasses all pig weights between a minimum and a maximum weight. In the embodiment of FIG. 7B, the prize tier includes an integer part and a fractional part (i.e., digit following the decimal point). The integer part of the prize tier is equal to the state reached by the pig. For example, state 2 includes three ranges: 2.1 for weights between 100 and 132 pounds; 2.2 for weights between 133 and 165 pounds; and 2.3 for weights between 166 and 199 pounds.

Once the prize tier is determined, the prices defined in the tier are awarded to the partners. In the embodiment of FIG. 7B, three prizes are given: Supplemental Prize A, Main Prize, and Supplemental Prize B.

It is noted that the embodiments illustrated in FIG. 7B are exemplary. Other embodiments may utilize different weight ranges, prizes, a different number of ranges, etc. The embodiments illustrated in FIG. 7B should therefore not be interpreted to be exclusive or limiting, but rather exemplary or illustrative.

Figure 8:
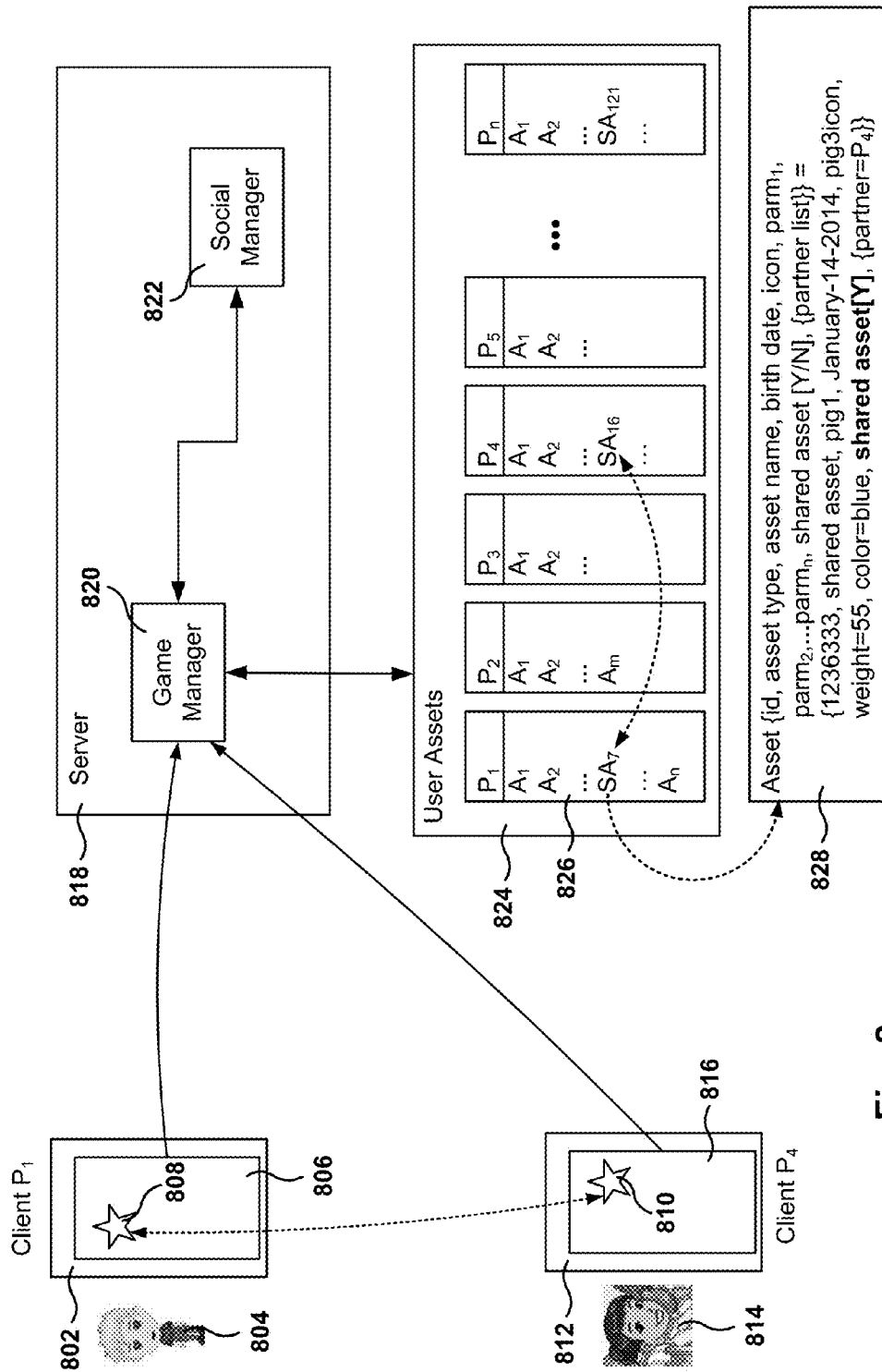
FIG. 8 illustrates interactions between client and server related to shared social assets, according to one embodiment.

FIG. 8 illustrates interactions between client and server related to shared social assets, according to one embodiment. In one embodiment, the online game is hosted by server 818, which includes a game manager 820, and a social manager 822. A first player $P_1$ 804 plays the game utilizing client device 802 executing a game computer program 806. In one embodiment, the computer program 806 is a web browser, and in another embodiment other computer programs may also be utilized to play the game, such as a computer program loaded on a computing device for the exclusive purpose of playing the game.

In one embodiment, the first player $P_1$ 804 has placed a social asset 808 in the game 806. Another player $P_4$ 814 is playing the same game as player $P_1$ 804 in game 816. The player $P_4$ 814 has partnered with player $P_1$ 804 to cooperate in game-related actions associated with the social asset. The player $P_4$ has placed a second instance of the social asset 810 in player $P_4$'s game board.

The game 806 interfaces with game server 818 to perform game operations, including game operations related to social assets. A social manager 822 provides social information to game manager 820 (e.g., relationships established through a social network or within the game).

Game server 818 is associated with database 824 of user assets. Database 824 includes the list of assets currently owned by each player, such as asset list 826 for player $P_1$. With each asset there is a list 828 of attributes and parameters associated with the asset. In one embodiment, the list of assets includes an asset ID, asset type, asset name, asset creation time, icon associated with the asset, a plurality of parameters depending on the type of asset, a Boolean flag determining if the asset is the shared asset, a partner list (applicable only to share assets), etc.

When two players partner to develop a social asset, each player has an instance of the social asset in the asset list, because each player places the instance of the social asset in their own game board. In the example of FIG. 8, player $P_1$ has a social asset $SA_7$, which is linked to the same social asset implemented for player $P_4$ as $SA_{16}$.

It is noted that the embodiments illustrated in FIG. 8 are exemplary. Other embodiments may utilize different modules, computer programs, interactions, social asset implementations, database structures, etc. For example, in one embodiment, social assets are kept in a separate list from the regular assets, and each social asset includes information regarding the players having the social asset. The embodiments illustrated in FIG. 8 should therefore not be interpreted to be exclusive or limiting, but rather exemplary or illustrative.

Figure 9:
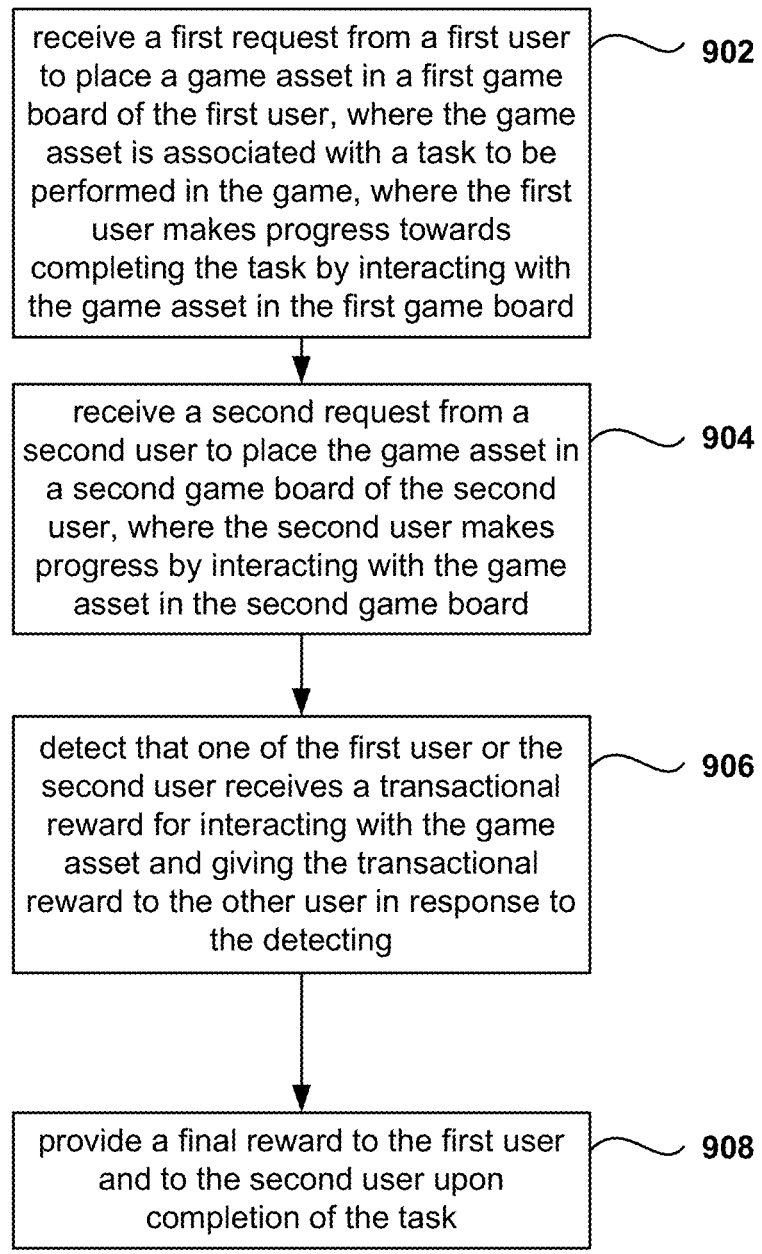
FIG. 9 is a flowchart illustrating an algorithm for playing a game, in accordance with one embodiment.

FIG. 9 is a flowchart illustrating an algorithm for playing a game, in accordance with one embodiment. In operation 102, a first request is received from a first user, the request being for placing a game asset in a first game board associated with the first user. The game asset is associated with a social asset task to be performed in the game, and the first user makes progress towards completing the social asset task by interacting with the game asset in the first game board.

From operation 802, the method flows to operation 904 where a second request is received from the second user. The request is for placing the same game asset in the second game board of the second user. The second user makes progress in the game by interacting with the game asset in her own second game.

From operation 904 the method flows to operation 906, where the game detects that one of the first user or the second user has received a transactional reward for interacting with the game asset. In one embodiment, the transactional reward is given for feeding a pig. In response to the detection, the game gives the same transactional reward to the other user.

From operation 906, the method flows to operation 908 where, upon completion of the social asset task, a final reward is provided to the first user and to the second user.

Figure 10:
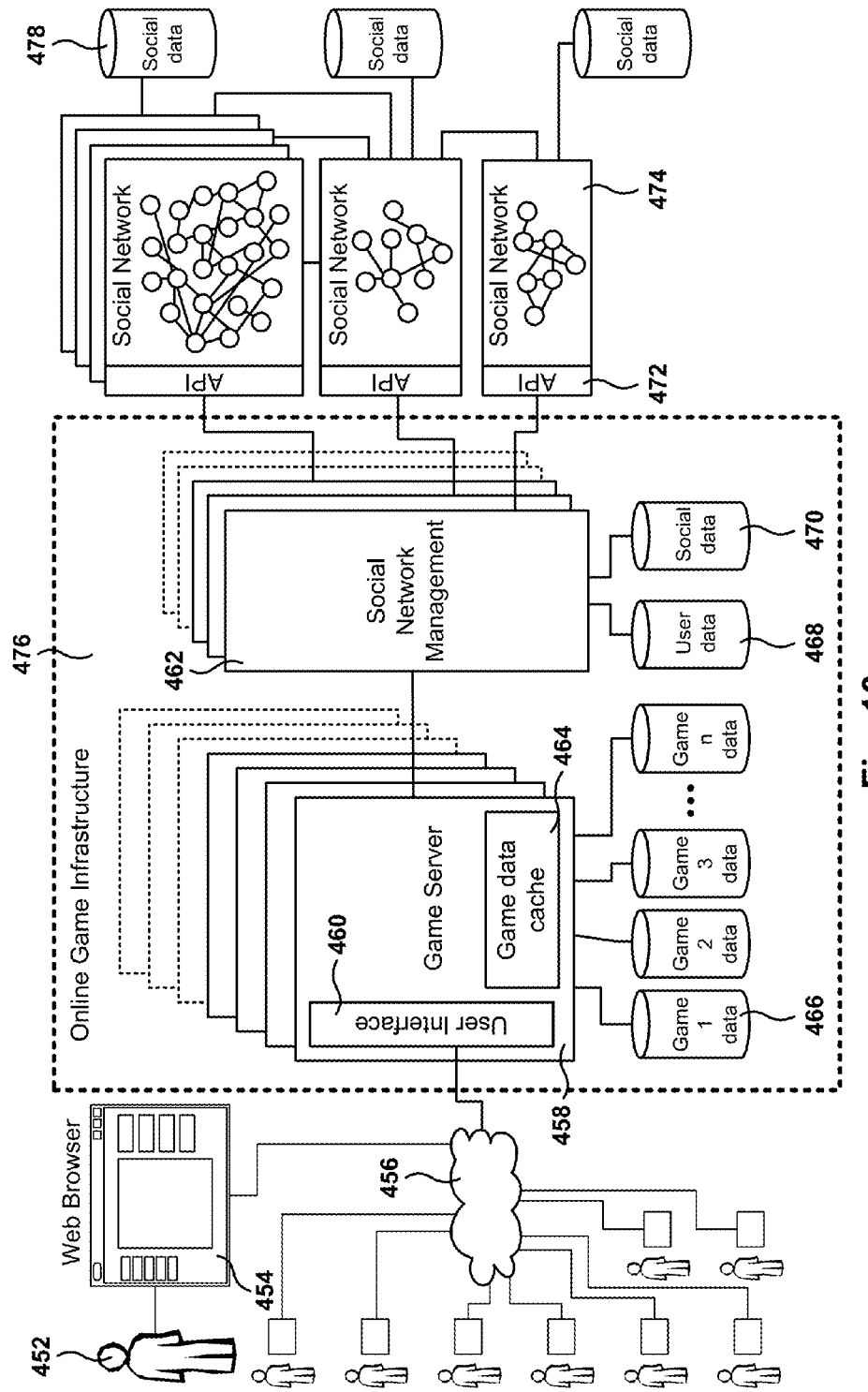
FIG. 10 illustrates an implementation of a Massively Multiplayer Online (MMO) infrastructure, according to one embodiment.

FIG. 10 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours.

In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 10 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 10 should therefore not be interpreted to be exclusive or limiting, but rather exemplary or illustrative.

Figure 11:
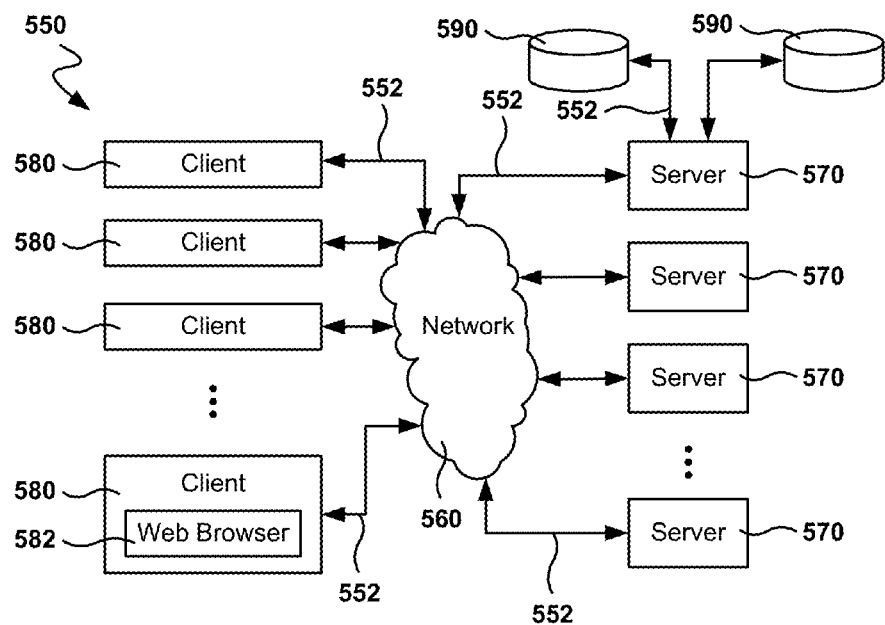
FIG. 11 illustrates an example network environment suitable for implementing embodiments.

FIG. 11 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 12:
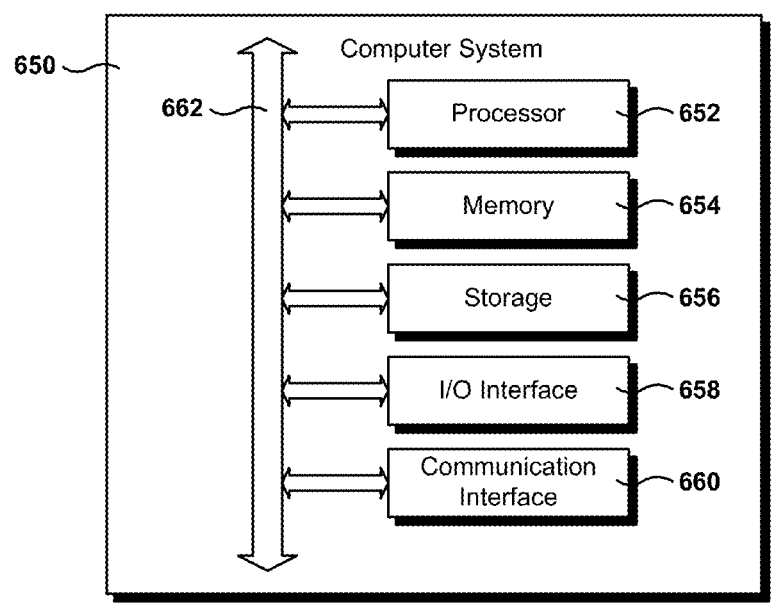
FIG. 12 illustrates an example computer system for implementing embodiments.

FIG. 12 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. § 101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for playing an online game, the method comprising:
    defining a game board for each of a plurality of users participating in the online game, wherein each user participating in the online game owns a respective instance of the game board;
    receiving a first request from a first user to place a game asset in a first game board of the first user, the game asset being a shareable asset in association with one or more users, wherein the game asset is associated with a task to be performed in the online game;
    placing a first instance of the game asset in the first game board, wherein the first user makes progress towards completing the task by interacting with the first instance of the game asset in the first game board;
    receiving a second request from a second user to place the game asset in a second game board of the second user in response to an invitation to partner in completing the task, wherein the second user is discoverable through invocation of an application programming interface (API) to access a social network server, the social network server returning information on who are friends of the first user in a social network, wherein one or more friends of the first user are invited to partner in completing the task;
    placing a second instance of the game asset in the second game board, wherein the second user makes progress towards completing the task by interacting with the second instance of the game asset in the second game board, wherein interactions of the first user and the second user with respective instances of the game asset cause cumulative progress towards completion of the task; and
    proportionally evolving the first and second instances of the game asset in parallel in relation to the cumulative progress towards completion of the task.

2. The method of claim 1, further comprising:
    depicting the first game asset as a graphical image in the first game board that has a dynamically changing size that is related to a weight, wherein the weight is based on the cumulative progress made towards completion of the task.

3. The method of claim 1, wherein the proportionally evolving further comprises:
receiving input defining an interaction with the first instance of the game asset at a back end server supporting a plurality of game boards for the plurality of users participating in the online game;
determining a plurality of instances of the game asset that is shared by accessing a database storing relational information of the plurality of instances, wherein the plurality of instances of the game asset is placed into a plurality of game boards;
determining first progress related to the input made in association with the cumulative progress;
updating a state of the first instance of the game asset based on the updated cumulative progress; and
propagating the state of the first instance of the game asset to each of the plurality of instances of the game asset.

4. The method of claim 1, wherein the proportionally evolving further comprises:
receiving a first interaction of the first user or second user with a respective instance of the game asset, the first interaction resulting in first progress towards completing the task; and
evolving in parallel the first and second instances of the game asset to a first intermediate state in proportion to the first progress, wherein the first and second instances of the game asset displayable in the first and second game boards are reflective of the first intermediate state.

5. The method of claim 4, further comprising:
receiving a second interaction of the other user with its respective instance of the game asset, the second interaction resulting in second progress towards completing the task, wherein the second progress shows further completion of the task than the first progress; and
evolving in parallel the first and second instances of the game asset to a second intermediate state in proportion to the second progress, wherein the first and second instances of the game asset displayable in the first and second game boards are reflective of the second intermediate state.

6. The method of claim 1, wherein the first user and the second user can interact with the game asset in their respective game boards independently from each other, wherein the second user can interact with the second instance of the game asset without visiting the first game board.

7. The method of claim 1, further comprising:
detecting that one of the first user or the second user receives a first transactional reward for interacting with their respective instance of the game asset based on a current progress towards completion of the task; and
giving a second transactional reward to the other user based on the first transactional reward.

8. The method of claim 7, wherein the first and second transactional rewards are identical.

9. The method of claim 7, wherein the first transactional reward is based on contributions of the corresponding user towards completion of the task in association with the current progress, and wherein the second transactional reward is based on contributions of the other user in association with the current progress.

10. A computer program embedded in a non-transitory computer-readable storage medium, when executed by one or more processors, for playing an online game, the computer program comprising:
program instructions for defining a game board for each of a plurality of users participating in the online game, wherein each user participating in the online game owns a respective instance of the game board;
program instructions for receiving a first request from a first user to place a game asset in a first game board of the first user, the game asset being a shareable asset in association with one or more users, wherein the game asset is associated with a task to be performed in the online game;
program instructions for placing a first instance of the game asset in the first game board, wherein the first user makes progress towards completing the task by interacting with the first instance of the game asset in the first game board;
program instructions for receiving a second request from a second user to place the game asset in a second game board of the second user in response to an invitation to partner in completing the task, wherein the second user is discoverable through invocation of an application programming interface (API) to access a social network server, the social network server returning information on who are friends of the first user in a social network, wherein one or more friends of the first user are invited to partner in completing the task;
program instructions for placing a second instance of the game asset in the second game board, wherein the second user makes progress towards completing the task by interacting with the second instance of the game asset in the second game board, wherein interactions of the first user and the second user with respective instances of the game asset cause cumulative progress towards completion of the task; and
program instructions for proportionally evolving the first and second instances of the game asset in parallel in relation to the cumulative progress towards completion of the task.

11. The computer program of claim 10, further comprising:
program instructions for depicting the first game asset as a graphical image in the first game board that has a dynamically changing size that is related to a weight, wherein the weight is based on the cumulative progress made towards completion of the task.

12. The computer program of claim 10, wherein the program instructions for proportionally evolving further comprises:
program instructions for receiving input defining an interaction with the first instance of the game asset at a back end server supporting a plurality of game boards for the plurality of users participating in the online game;
program instructions for determining a plurality of instances of the game asset that is shared by accessing a database storing relational information of the plurality of instances, wherein the plurality of instances of the game asset is placed into a plurality of game boards;
program instructions for determining first progress related to the input made in association with the cumulative progress;
program instructions for updating a state of the first instance of the game asset based on the updated cumulative progress; and
program instructions for propagating the state of the first instance of the game asset to each of the plurality of instances of the game asset.

13. The computer program of claim 10, wherein the program instructions for proportionally evolving further comprises:

program instructions for receiving a first interaction of the first user or second user with a respective instance of the game asset, the first interaction resulting in first progress towards completing the task; and program instructions for evolving in parallel the first and second instances of the game asset to a first intermediate state in proportion to the first progress, wherein the first and second instances of the game asset displayable in the first and second game boards are reflective of the first intermediate state.

14. The computer program of claim 13, further comprising:

program instructions for receiving a second interaction of the other user with its respective instance of the game asset, the second interaction resulting in second progress towards completing the task, wherein the second progress shows further completion of the task than the first progress; and program instructions for evolving in parallel the first and second instances of the game asset to a second intermediate state in proportion to the second progress, wherein the first and second instances of the game asset displayable in the first and second game boards are reflective of the second intermediate state.

15. The computer program of claim 10, wherein the first user and the second user can interact with the game asset in their respective game boards independently from each other, wherein the second user can interact with the second instance of the game asset without visiting the first game board.

16. A computer system comprising:

a processor; and memory coupled to the processor and having stored therein instructions that, if executed by the computer system, cause the computer system to execute a method for playing an online game comprising:

defining a game board for each of a plurality of users participating in the online game, wherein each user participating in the online game owns a respective instance of the game board;

receiving a first request from a first user to place a game asset in a first game board of the first user, the game asset being a shareable asset in association with one or more users, wherein the game asset is associated with a task to be performed in the online game;

placing a first instance of the game asset in the first game board, wherein the first user makes progress towards completing the task by interacting with the first instance of the game asset in the first game board;

receiving a second request from a second user to place the game asset in a second game board of the second user in response to an invitation to partner in completing the task, wherein the second user is discoverable through invocation of an application programming interface (API) to access a social network server, the social network server returning information on who are friends of the first user in a social network, wherein one or more friends of the first user are invited to partner in completing the task;

placing a second instance of the game asset in the second game board, wherein the second user makes progress towards completing the task by interacting with the second instance of the game asset in the second game board, wherein interactions of the first user and the second user with respective instances of the game asset cause cumulative progress towards completion of the task; and proportionally evolving the first and second instances of the game asset in parallel in relation to the cumulative progress towards completion of the task.

17. The computer system of claim 16, wherein the method further comprises:

depicting the first game asset as a graphical image in the first game board that has a dynamically changing size that is related to a weight, wherein the weight is based on the cumulative progress made towards completion of the task.

18. The computer system of claim 16, wherein the method further comprises:

receiving input defining an interaction with the first instance of the game asset at a back end server supporting a plurality of game boards for the plurality of users participating in the online game;

determining a plurality of instances of the game asset that is shared by accessing a database storing relational information of the plurality of instances, wherein the plurality of instances of the game asset is placed into a plurality of game boards;

determining first progress related to the input made in association with the cumulative progress;

updating a state of the first instance of the game asset based on the updated cumulative progress; and propagating the state of the first instance of the game asset to each of the plurality of instances of the game asset.

19. The computer system of claim 16, wherein the proportionally evolving in the method further comprises:

receiving a first interaction of the first user or second user with a respective instance of the game asset, the first interaction resulting in first progress towards completing the task; and evolving in parallel the first and second instances of the game asset to a first intermediate state in proportion to the first progress, wherein the first and second instances of the game asset displayable in the first and second game boards are reflective of the first intermediate state.

20. The computer system of claim 19, wherein the method further comprises:

receiving a second interaction of the other user with its respective instance of the game asset, the second interaction resulting in second progress towards completing the task, wherein the second progress shows further completion of the task than the first progress; and evolving in parallel the first and second instances of the game asset to a second intermediate state in proportion to the second progress, wherein the first and second instances of the game asset displayable in the first and second game boards are reflective of the second intermediate state.

* * * * *